Patented Feb. 8, 1949

2,460,996

UNITED STATES PATENT OFFICE 2,460,996

PRODUCTION OF 3-CHLORO METHACRYLONITRILE

Jerome L. Mostek, Chicago, Ill., assignor to Sinclair Refining Company, New York, N. Y., a corporation of Maine No Drawing. Application August 1, 1945, Serial No. 608,354

1 Claim. (Cl. 260—465.7)

This invention relates to improvements in the production of 3-chloromethacrylonitrile.

In accordance with the invention, 3-chloromethacrylonitrile is produced by reaction of liquid anhydrous ammonia with 2,3-dichloroisobutyronitrile. The reaction is carried out under conditions such that the ammonia remains liquid. It can be carried out conveniently at room temperature under sufficient pressure to keep the ammonia liquefied, or somewhat higher temperatures or lower temperatures may be used. Advantageously, in carrying out the reaction, a substantial excess of ammonia is used, for example, several moles of ammonia to each mole of nitrile. Ratios of around 8–10 moles of ammonia to 1 mole of nitrile give very good results. The reaction is ordinarily carried out by admixing the two reactants in a suitable pressure vessel and allowing them to remain for several hours, then releasing the ammonia and separating the product from the ammonium chloride which is formed.

The invention will be illustrated by the following example but it is not limited thereto.

*Example.*—155 parts of liquid ammonia and 138 parts of 2,3-dichloroisobutyronitrile are introduced into a pressure vessel and allowed to stand for 18 hours at 20–25° C., room temperature. The excess ammonia is then removed by releasing the pressure and the product extracted from the ammonium chloride with benzene. The resulting benzene solution is fractionated, initially at atmospheric pressure to remove the benzene and then at 50 mm. pressure. The fraction boiling up to 82° C. at 50 mm. pressure is fractionated, and on refractionation the 3-chloromethacrylonitrile is collected as the fraction boiling at 78.5° C./50 mm.

I claim:

In a process for producing 3-chloromethacrylonitrile, the improvement which consists of reacting 2,3-dichloroisobutyronitrile with liquid anhydrous ammonia in proportions approximating 8 to 10 moles of ammonia to 1 mole of nitrile at a temperature approximating 20° to 25° C. and thereafter recovering 3-chloromethacrylonitrile by removing unreacted ammonia from the reaction mixture, then extracting the residue with a solvent, and recovering 3-chloromethacrylonitrile from the extract by distillation.

JEROME L. MOSTEK.

REFERENCES CITED

The following references are of record in the file of this patent:

UNITED STATES PATENTS

| Number | Name | Date |
|---|---|---|
| 2,109,929 | Rigby | Mar. 1, 1938 |
| 2,298,739 | Lichty | Oct. 13, 1942 |
| 2,328,984 | Lichty | Sept. 7, 1943 |

FOREIGN PATENTS

| Number | Country | Date |
|---|---|---|
| 462,181 | Great Britain | Mar. 3, 1937 |